United States Patent
Banfi et al.

(10) Patent No.: US 10,050,561 B2
(45) Date of Patent: Aug. 14, 2018

(54) THREE-LEVEL INVERTER SWITCHING

(71) Applicant: SunPower Corporation, San Jose, CA (US)

(72) Inventors: Gabor Banfi, Austin, TX (US); Jonathan List Ehlmann, Austin, TX (US); Hengsi Qin, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/395,911

(22) Filed: Dec. 30, 2016

(65) Prior Publication Data
US 2018/0191273 A1 Jul. 5, 2018

(51) Int. Cl.
H02M 7/5387 (2007.01)
H02M 7/539 (2006.01)
H02M 1/12 (2006.01)
H02M 1/42 (2007.01)
H02M 7/483 (2007.01)
H02M 1/00 (2006.01)

(52) U.S. Cl.
CPC ......... *H02M 7/53871* (2013.01); *H02M 1/12* (2013.01); *H02M 1/42* (2013.01); *H02M 7/483* (2013.01); *H02M 7/539* (2013.01); *H02M 2001/0058* (2013.01)

(58) Field of Classification Search
CPC ......... H02M 2001/0058; H02M 1/081; H02M 1/12; H02M 1/42; H02M 7/483; H02M 7/5387; H02M 7/53871; H02M 7/539; G05F 1/70
See application file for complete search history.

(56) References Cited

U.S. PATENT DOCUMENTS

| | | | | |
|---|---|---|---|---|
| 9,673,735 B2* | 6/2017 | Hara | .................... | H02M 7/5387 |
| 2013/0193775 A1* | 8/2013 | Lee | .......................... | H02J 5/00 |
| | | | | 307/151 |
| 2014/0104897 A1* | 4/2014 | Li | ........................... | H02J 9/062 |
| | | | | 363/37 |
| 2014/0160824 A1* | 6/2014 | Inomata | ............... | H02M 5/293 |
| | | | | 363/150 |
| 2014/0292092 A1* | 10/2014 | Ichinose | ................. | H02J 5/005 |
| | | | | 307/104 |
| 2014/0307489 A1* | 10/2014 | Kidera | .................. | H02M 7/487 |
| | | | | 363/40 |
| 2015/0036403 A1* | 2/2015 | Yu | ....................... | H02M 7/5387 |
| | | | | 363/132 |

(Continued)

OTHER PUBLICATIONS

Saad Pervaiz et al., A Novel Single-Phase Soft Switching Microinverter for Photovoltaic Applications, 3rd International Conference on Electric power and Energy Conversion Systems, Yildiz Technical University, Oct. 2-4, 2013.

(Continued)

*Primary Examiner* — Fred E Finch, III

(74) *Attorney, Agent, or Firm* — Grasso PLLC

(57) ABSTRACT

Inverter circuit operation for managing power factor changes is provided. Various modes of switch timing may be employed near zero-voltage crossings. Inverter switch timing may change during a cycle such that one timing strategy is employed approaching or leaving a zero-voltage crossing while another timing strategy is employed at other times of the cycle.

20 Claims, 15 Drawing Sheets

(56) References Cited

U.S. PATENT DOCUMENTS

| | | | | |
|---|---|---|---|---|
| 2015/0236617 A1* | 8/2015 | Pahlevaninezhad | H02M 7/5387 | 363/132 |
| 2015/0280612 A1* | 10/2015 | Ide | H02M 7/53871 | 363/98 |
| 2016/0072404 A1* | 3/2016 | Beebe | H03B 5/26 | 363/97 |
| 2016/0149513 A1* | 5/2016 | Fujikawa | H02M 7/5387 | 363/132 |
| 2017/0279375 A1* | 9/2017 | Rodriguez | H02M 7/5387 | |

OTHER PUBLICATIONS

Aniruddha Mukherjee, Single Stage Flyback Micro-Inverter for Solar Energy Systems, Electronic Thesis and Dissertation Repository The University of Western Ontario, 2013.

Digitally Controlled Solar Micro Inverter Using C2000 Piccolo Microcontroller, Texas Instruments, 2014.

* cited by examiner

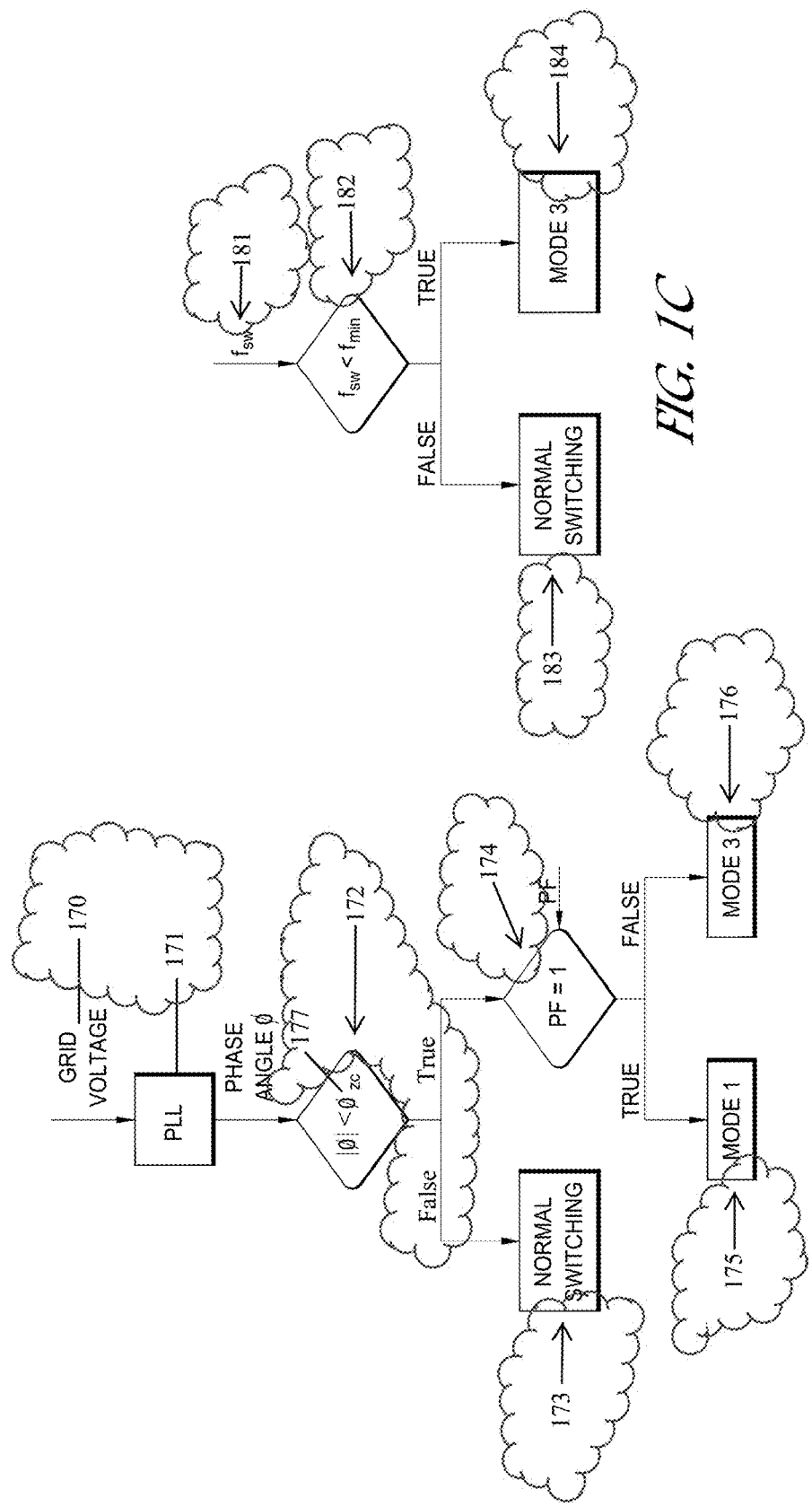

THREE-LEVEL INVERTER SWITCHING

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Electrical power converter circuits serve to convert electrical power from one state to another. This change of state can include raising voltages or currents from an input value to a target output value. Likewise, input voltages and input currents can also be lowered from an input value to a target output value. Electrical power inverter circuits serve to modify a direct current or voltage to a cyclic voltage or current and vice-versa. For example, when a direct voltage is received by an inverter circuit the inverter circuit, through the use of one or more pairs of switches, can convert the received direct voltage into an alternating voltage for output. Likewise, an inverter circuit may also convert a received alternating voltage, through the use of one or more switches or other circuit topology, into a direct current. for output. In each example, the converter and inverter may output the modified electrical voltage or current for subsequent use or treatment.

BRIEF DESCRIPTION OF THE DRAWINGS

FIGS. 1A-1C illustrate schematics showing circuit monitoring and operational mode selection, according to some embodiments.

DETAILED DESCRIPTION

Figure 1A:
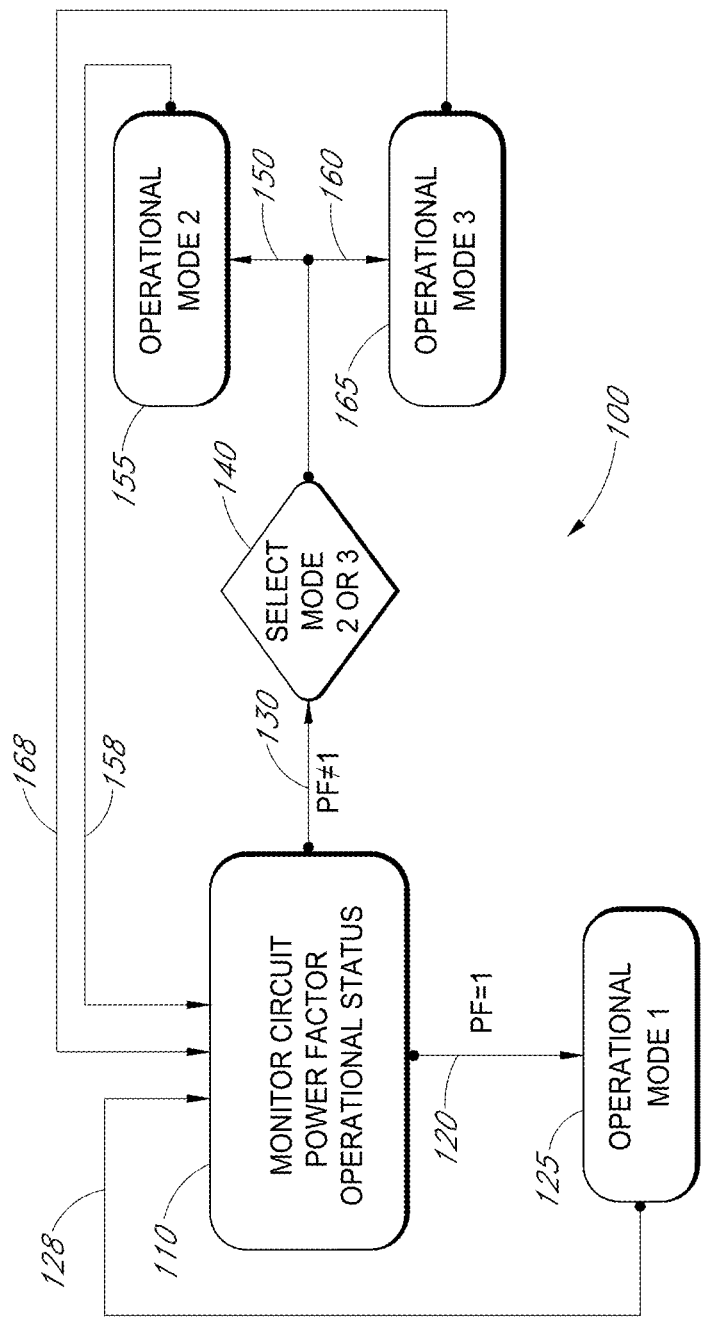

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" mode of operation does not necessarily imply that this mode of operation is the first mode of operation in a sequence; instead the term "first" is used to differentiate a mode of operation from another mode of operation (e.g., a "second" mode of operation).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

This specification describes aspects of various modes of operation for inverter circuit topologies followed by a detailed explanation of embodiments of these modes of operation and topologies. Figures and text may be understood as describing aspects that may be used in various combinations and with or without other aspects not explicitly identified herein. Thus, various nonlimiting, teaching examples are provided throughout for conveying aspects of embodiments that may be combined in various portions, in various aspects and in various ways.

Embodiments may include a switching power train comprising an H-bridge configuration where two of the switches may be switched at high speeds, e.g., hi-speed MOSFETS switching at 75 kHz, and two of the switches may be switched at a line frequency, e.g., low-speed MOSFTS switching at 60 Hz. These pairs of switches may then be operated in various switching modes depending upon the topology and the power factor experienced by the circuit and the voltage phase angle with respect to a zero-voltage crossing. When operational power factor is observed to be one, i.e., a unity power factor, the switches may be timed to fire with a first switch-state timing mode that has consistent switch timing approaching and leaving zero-voltage crossings. Comparatively, when operational power factor is observed to be other than one, i.e., a non-unity power factor, a three or more switch-state mode may be employed approaching and leaving a zero-voltage crossing as well as during other portions of the voltage cycle, and for the entire voltage cycle also. Power factor may be monitored in on ongoing fashion along with switching frequencies and operational modes may be repeatedly selected and used, depending upon the existing power factor status, monitored switching frequency, voltage phase angle, and grid voltage phase angle, among other things.

Switching modes employed when a non-unity power factor exists may include switch timing protocols that accelerate switching frequency around voltage zero-crossing and/or decrease switching frequency around zero-crossing. The increased switching may serve to reduce distortion while the decreased switching may serve to improve efficiency. Each of these modified switching states may begin ahead of a zero-voltage crossing, may continue through a zero-voltage crossing, and may be maintained for a period of time after a zero-voltage crossing. Changing switching frequency around voltage zero-crossing may be performed in a range that may be advantageous for limiting output current distortion and for minimizing EMI interference.

Embodiments may employ switching schemes with an additional switching state that may serve to keep switching frequency within a preferable range, whereby the frequency may not be too low to distort the output current and may not be too high to untenably magnify EMI distortion. In embodiments, one or more switching modes and combinations of these modes may provide for acceptable current distortion to meet harmonic targets and for acceptable EMI and efficiency requirements, all through modified switching techniques. For example, while within a target switching range one or more modes of operation may include switching low-frequency pairs of switches during zero-voltage crossing at a minimum switching frequency. For another, a balance may be struck between conduction losses and switching losses in embodiments, where switching frequency in embodiments may be managed in various ranges with preferred ranges being outside of the conducted EMI band of 150 kHz to 30 MHz.

In embodiments, low frequency switching ranges may be at or around line frequency while high frequency switching may be hundreds or thousands of times faster. Thus, in embodiments, switches, such as field-effect transistors, may be switched in pairs and their switching schedule may change when the power factor is not unity such that a few degrees or more before through a few degrees or more after each zero-voltage crossing their switching command protocols change from one mode to another mode or make another type of switching change. By changing the switching schemes for switches in this manner, reduced distortion or other benefits may be realized while power losses may be reduced. In embodiments, multiple switching modes may be used even when the power factor is unity, although using non-unity operational modes when there is a unity power factor may not be preferred because of anticipated additional current losses attributable to the switching modification.

In embodiments, a zero-voltage state, e.g., a short circuit, for all four switches in an H-bridge may be represented by a time $T_z$. $T_z$ may be obtained from look-up tables and may also be determined based on estimated voltages, power factors and switching frequencies. Hysteresis techniques may also be employed to set or adjust $T_z$, as well as other switching parameters. Hard switching through a zero-cross may also be performed as a switching mode, but other methods, which provide less power loss and noise may be more preferable In embodiments, the resultant current wave from a three-tier switching scheme or other multi-tier switching scheme, may be trapezoidal with a first section rising or falling at one rate, a period of time, during a zero-voltage switching state, when a short across the switches occurs and the current deteriorates a second rate, and a third period of time, when the zero-switching state is over, where a third rate of current dissipation or increase occurs. This zero-switching state may be used during a portion of a full voltage cycle, e.g., within ±1°, ±2°, ±5°, ±15°, ±20°, ±25°, etc., of the zero-voltage crossing for the cycle as well as during the entire voltage cycle. Also, there may be other ranges and the ranges may be both symmetrical and asymmetrical in embodiments.

In embodiments, a first switching scheme may be in place during a switching cycle, for the majority of the cycle, but as the zero-crossing approaches or is passed, a second switching scheme may be employed. This second mode may be triggered within a degree or two of the crossing or at other times as well, including within ±0.1°, ±0.3°, ±0.5°, ±1°, ±2°, ±5°, ±15°, ±20°, ±25°, etc. of the zero-voltage crossing for that cycle. Still further, other switching modes employing different switching states may also be used.

FIG. 1A is a flow chart 100 illustrating a process for operating an inverter power train according to some embodiments. Labelled in FIG. 1A is step 110, which may include monitoring the power factor status of one or more power train circuits. The power factor monitoring may be conducted locally as part of the circuit topology for a power train and may also be conducted centrally for more than one power train circuit and then reported to the appropriate management control for subsequent management of the power train operation. As shown at 120, when the power factor for the power train circuit is determined to be one, e.g., in unity, operational mode 1 may be selected for purposes of the timing and frequency of gate signals being used to drive switches of a power train in the circuit experiencing the unity power factor loading. As shown at 128, the monitoring of the circuit may continue and when the power factor remains at one, the mode of operation may remain the same.

As shown at 130, when the power factor is determined to be other than unity, either leading or lagging, a different mode of operation may be selected. These modes, which are shown at 155 and 165 may offer different timing and frequency for gate signals being sent to switches of the power train experiencing the non-unity power factor. For example, when an H-Bridge topology is employed in the power train, in modes 2 and 3, two of the switches may be firing in a high frequency, e.g., 50-150 KHz, while two of the switches may be firing at line frequency, then, when a zero-voltage crossing is approaching the timing and firing sequence of at least one of the pairs of switches may be altered. For mode 2, for example, the low-frequency gates may no longer receive their own gate signals and may, instead, share gate signals for the other pair of switches for a period of time before and after the switch in polarity of the output voltage, i.e., the zero-voltage crossing. For mode 3, for example, the low-frequency gates may also have their gate signals modified as the zero-crossing is approached and subsequently moved away from. In mode 3, a brief a zero-voltage switching state (i.e., short circuit) may be introduced into the switching cycle of the switches such that the resulting current peak has a change in its rate of degradation. In so doing, rather than have a single rate of increase and a single rate of decrease, of current resulting from the switching schedule, one leg of the increase in current or one leg of the decrease in current may have a first rate of change while the current on the other side of its peak may have two rates of change. Thus, three levels of switching are present in this third mode of operation.

Figure 11A:
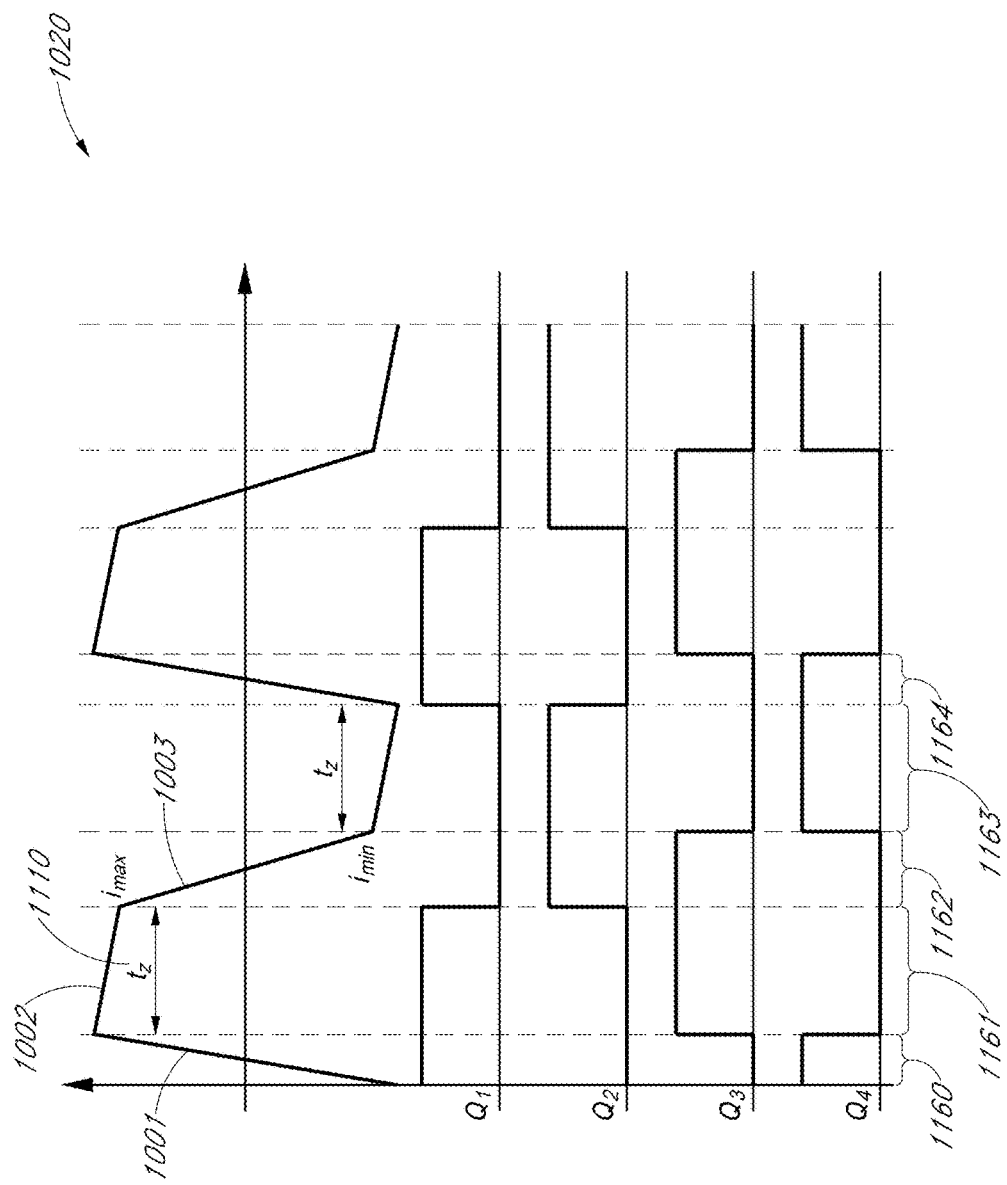
FIGS. 11A-11C illustrate an enlarged portion of the switch state table of FIG. 10 with various switch states and associated currents during a zero-voltage crossing, according to some embodiments.

FIG. 11A, which is discussed in more detail below, shows how switching losses from high frequency switching may be reduced along with distortion at zero-voltage crossings by using this third mode of operation. The different rates of change of the current are shown at 1001, 1002, and 1003. As can be seen, the current is increasing at 1001 at a first rate, then begins to decrease at a second rate 1002, and changes to a third rate of degradation at 1003. The short circuit (zero-voltage state) $t_z$ 1110 may coincide with the first rate of degradation and the duration of the short circuit, $t_z$ 1110 may be initially set based on an expected switching frequency and then adjusted using circuit feedback techniques. The frequency of the high frequency switching and other aspects of the operational mode may also be adjusted depending upon the AC voltage and the observed power factor. Also labeled in FIG. 11A are the switching period durations 1160-1164.

Other operation timing protocols may also be used for modes 2 and 3. Moreover, additional modes, such as combined timing protocols of modes 2 and 3, and other tailored modes as well, may also be added. In embodiments, reductions in switching losses and reductions in harmonic distortion may be sought by operating the circuit when the power factor is one in a first switching protocol and operating the circuit when the power factor is not unity under a different switching protocol. When the power factor is not unity, various modes may be employed and these modes may be employed for an entire switching cycle or, more preferably, for a period of the switching cycle, such, as during zero-voltage crossings, in order to enhance circuit performance Thus, in operation, a circuit may monitor its operation and the load activity and then switch multiple times between the three or more operational switching models to improve circuit efficiency when the power factor is not one. The timing and frequency of the switch timing within the various protocol themselves may be selected from tables as well as selected using circuit hysteresis or other feedback techniques.

In various embodiments, the processes of FIGS. 1A-AC can include additional (or fewer) blocks than illustrated. For example, in some embodiments, only two operational modes may be available for selection rather than the three shown in FIG. 1A. Likewise, several operational modes may be available for use during a single switching cycle and multiple switching cycles.

In embodiments, the default switching protocol may be the normal mode, which is preferably used when a unity power factor is experienced. This normal mode, i.e., mode 1, may also be used at times during each cycle when there is a non-unity power factor (PFC mode). In embodiments, the instantaneous AC voltage and/or instantaneous inductor current may be monitored during each control cycle. In so doing, estimates of the switching frequency for the normal mode may be conducted and the operational mode may be switched to another mode, such as mode three, the three-level mode, when the switching frequency becomes too low. A circuit manager, who provides instructions regarding the mode of operation of the power train, can employ on-line resources (as in firmware codes) as well as off-line resources (as in a look-up-table).

FIG. 1B shows a flowchart for managing operational modes in embodiments. A grid voltage 170 may be measured at 171 by a Phase Lock Loop (PLL) control system that may output the phase angle of the grid voltage 170. At 172, the absolute value of this grid phase angle may be monitored and when the absolute value is greater than a target phase angle zero-cross threshold normal switching 173 may be employed. Comparatively, at 172, when the absolute value is less than a target phase angle 177, power factor may be determined as shown at 174. When the power factor is found to be unity (175) then a first mode of operation may be employed. When the power factor is found to be non-unity, (176) a different mode may be employed. Thus, embodiments may track grid voltage phase angle and power factor and depending upon these parameters may employ normal switching modes or enhanced switching modes.

FIG. 1C also shows a flowchart for managing operational modes in embodiments. At 181 a switching frequency $f_{sw}$ of switches in a power train may be monitored and then compared at 182 with a minimum switching frequency $f_{min}$. When the frequency $f_{sw}$ is less than a desired minimum $f_{min}$ an altered mode of operation may be entered as is shown by 184. Conversely, when the frequency $f_{sw}$ is above a desired minimum $f_{min}$ a regular mode of operation may be maintained, as is shown by 183. Thus, in this management protocol unity power factor may or may not be considered and modes of operation may be switched based on the frequency of switching, with a target minimum employed to reduce switching instabilities at or around zero-voltage crossings.

Figure 2:
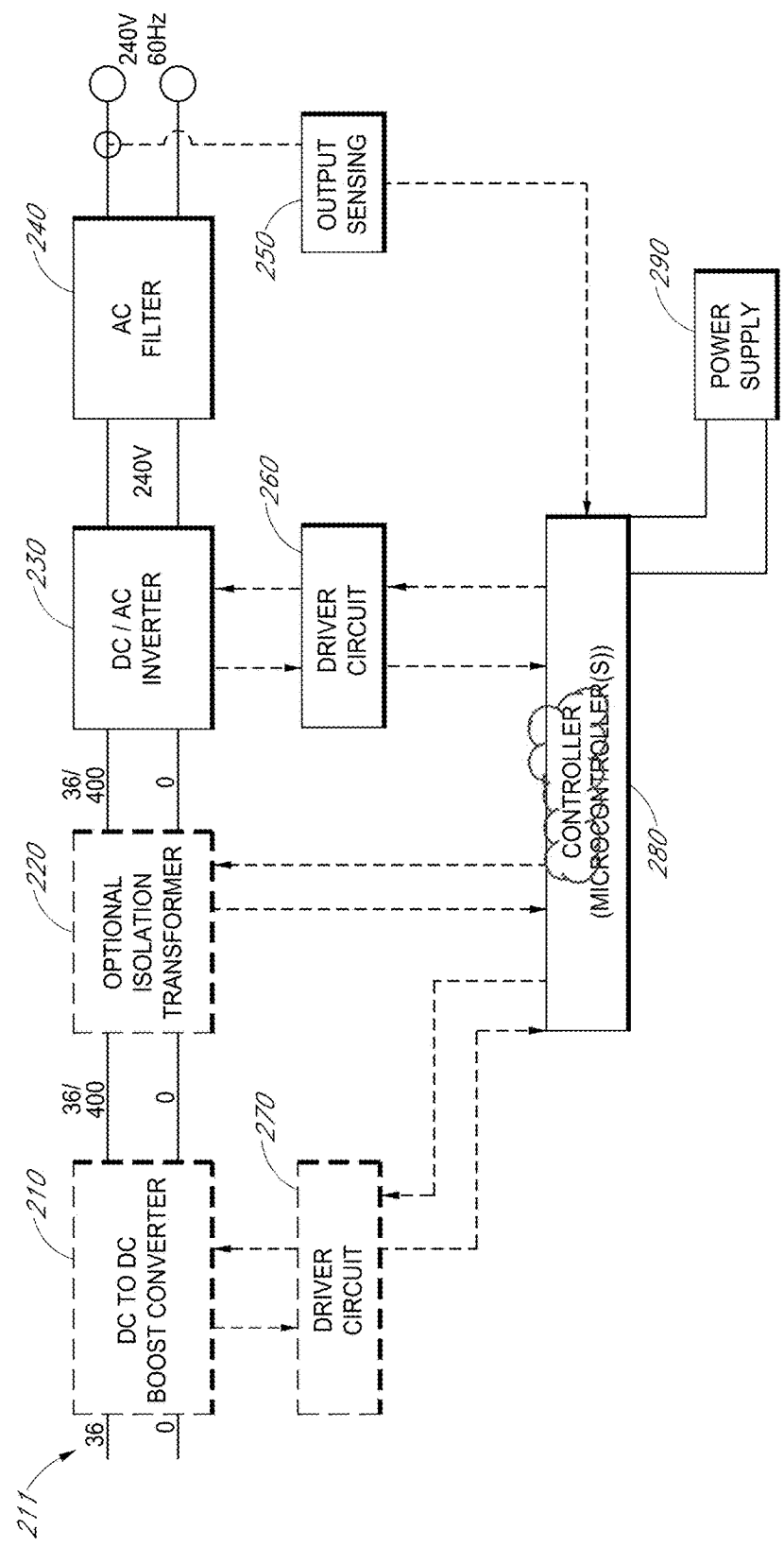
FIG. 2 illustrates a schematic of circuit topology for an inverter, according to some embodiments.

Turning now to FIG. 2, which illustrates, a block diagram of an inverter 200 as may be employed in embodiments. Labeled in FIG. 2 are an optional boost converter 210, an optional isolation transformer 220, an inverter 230, an output filter 240, optional driver circuit 270, driver circuit 260, output sensor 250, microcontroller 280, and power supply 290. Communications are designated by dashed lines while power exchange is designated with solid lines with the isolation transformer, boost converter 210, and driver circuit 270 also being dashed because they may be optional as well.

In operation, a DC source may provide a DC voltage input 211 to the inverter 200. This input voltage 211 may be stepped up in voltage by a boost converter 210 or may be passed directly to the inverter 230 or through an isolation transformer 220 before reaching the inverter 230. The inverter 230 may contain a topology with pairs of switches such that when the switches are fired in an alternating order, input dc voltage is converted to a cyclical ac output voltage. This AC output voltage may be further conditioned in AC filter 240. As can be seen, the inverter serves to change the DC input voltage of 400 volts to a mean AC voltage of 240 volts. These voltages may be different in this embodiment as well as different in other embodiments, as may the topology of the inverter 200 itself. For example, output voltages may be 208/240V and frequencies may range from 43 Hz to 60 Hz as well as other output voltages and frequencies.

In embodiments, when a controller 280 determines that the ratio of real power flowing to a load when compared to the apparent power in the circuit is not unity the controller may switch from a first operating mode to a different operating mode. This different operating mode, as described in more detail below, may serve to change the frequency and timing of gate signals sent by a driver circuit, such as 260, to switches in the powertrain of the dc/ac inverter 230. The different operating mode may operate switches otherwise operating at a low frequency switches in the powertrain to operate at a higher frequency for a portion of the output voltage cycle. The different operating mode may be structured such that the switching-states in the power train create periods of time where a short exists between switches in the power train, e.g., a zero-voltage state. Such a zero-voltage state can serve to change the rate of current decay in a subsequent circuit and, in so doing, prevent unwanted current losses while also minimizing EMI interferences associated with high switching rates near a zero-voltage cross. In operation, as one or more modes of operation is carried out and managed, the output sensor 250 or other feedback circuit can provide information to the controller 280 to determine the status of the load, the status of output voltage, and whether the power factor is or is not equal to one. The sensor 250 may provide other feedback as well.

In operation, the controller 280 may use lookup tables to determine the duration of any introduced gate signal delays, shorts, or overlaps, e.g., the switching-state. The controller 280 may also have access to algorithms to determine a mode of operation and any applicable gate signal delays, shorts or overlaps. Still further, external instructions may also be provided to the controller 280 such that system wide coordination may be performed and individual inverters 200 may be managed to coordinate switching-state operations for the specific inverter, as well as optimize overall system performance of many inverters or other components.

Figure 3:
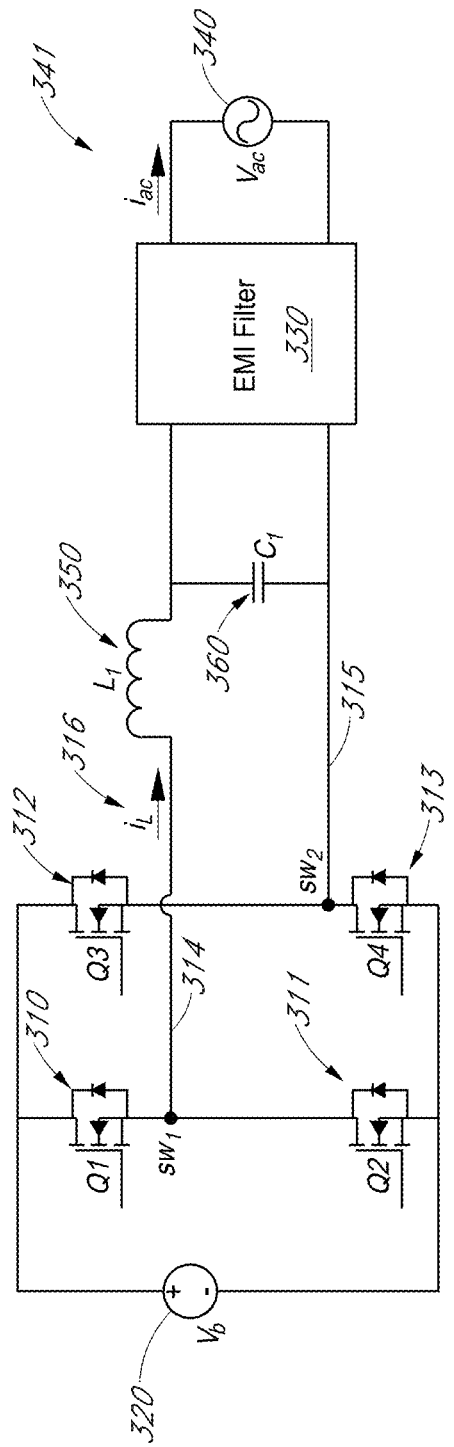
FIG. 3 illustrates a powertrain schematic, according to some embodiments.

FIG. 3 illustrates an output power train stage of an inverter according to some embodiments. Labeled in FIG. 3 are switches 310-313, DC bus voltage 320, AC voltage output 340, power train output 314 and 315, inductor 350, capacitor 360, unfiltered inductor current 316, filtered current 341, and EMI filter 330. The inductor and capacitor serve to dampen the output of the switches ahead of the EMI filter 330, which may serve to further condition the output voltage and current to be compatible with the AC grid or other receiving load. Thus, after the switches serve to create the alternating voltage the LC circuit and EMI filter serve to further condition the alternating voltage for receipt by a load. Hysteresis current control pulse-width modulation (PWM) may be employed to regulate the output current. Other feedback control systems may also be employed.

Figure 11B:
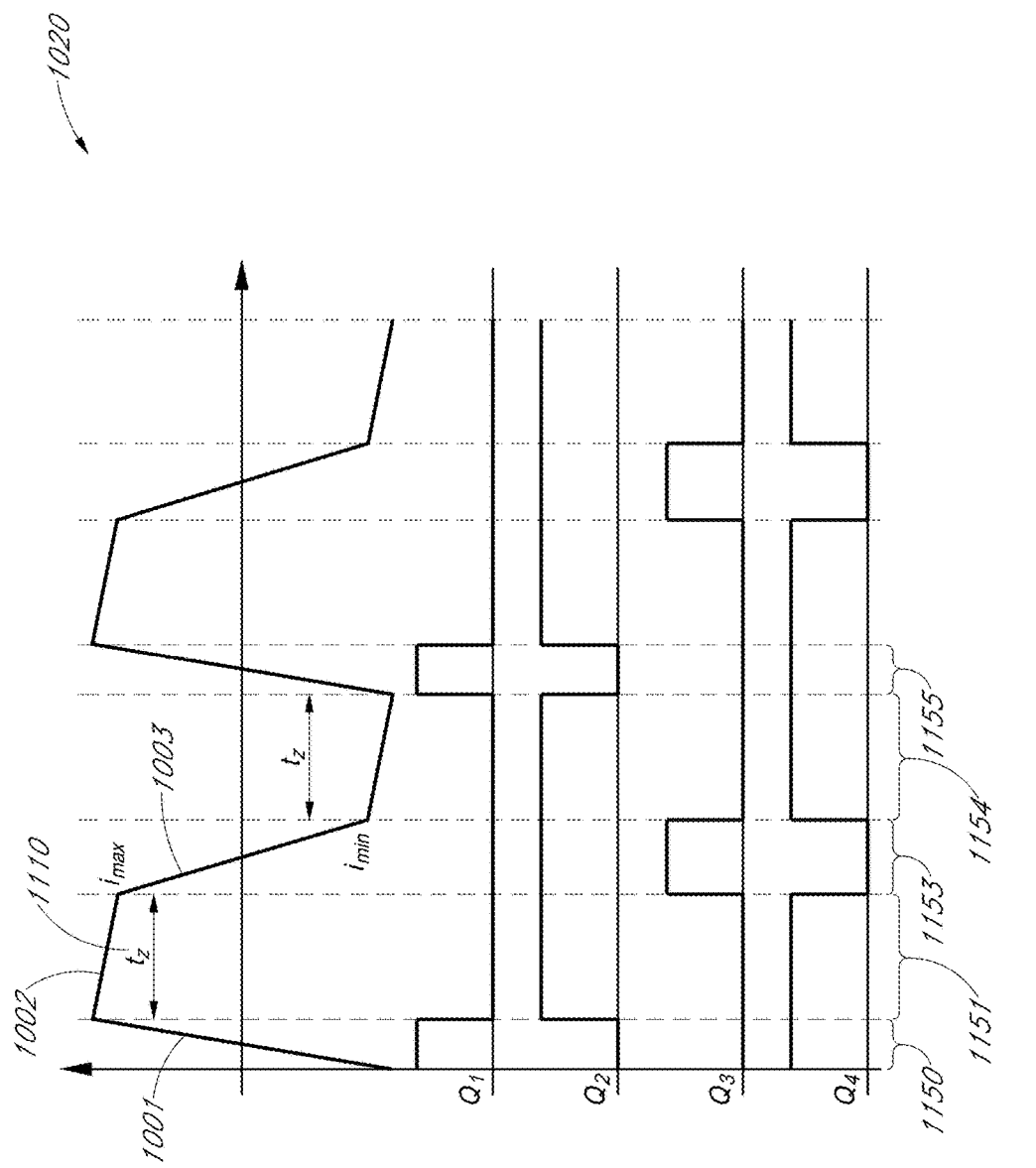
Figure 11C:
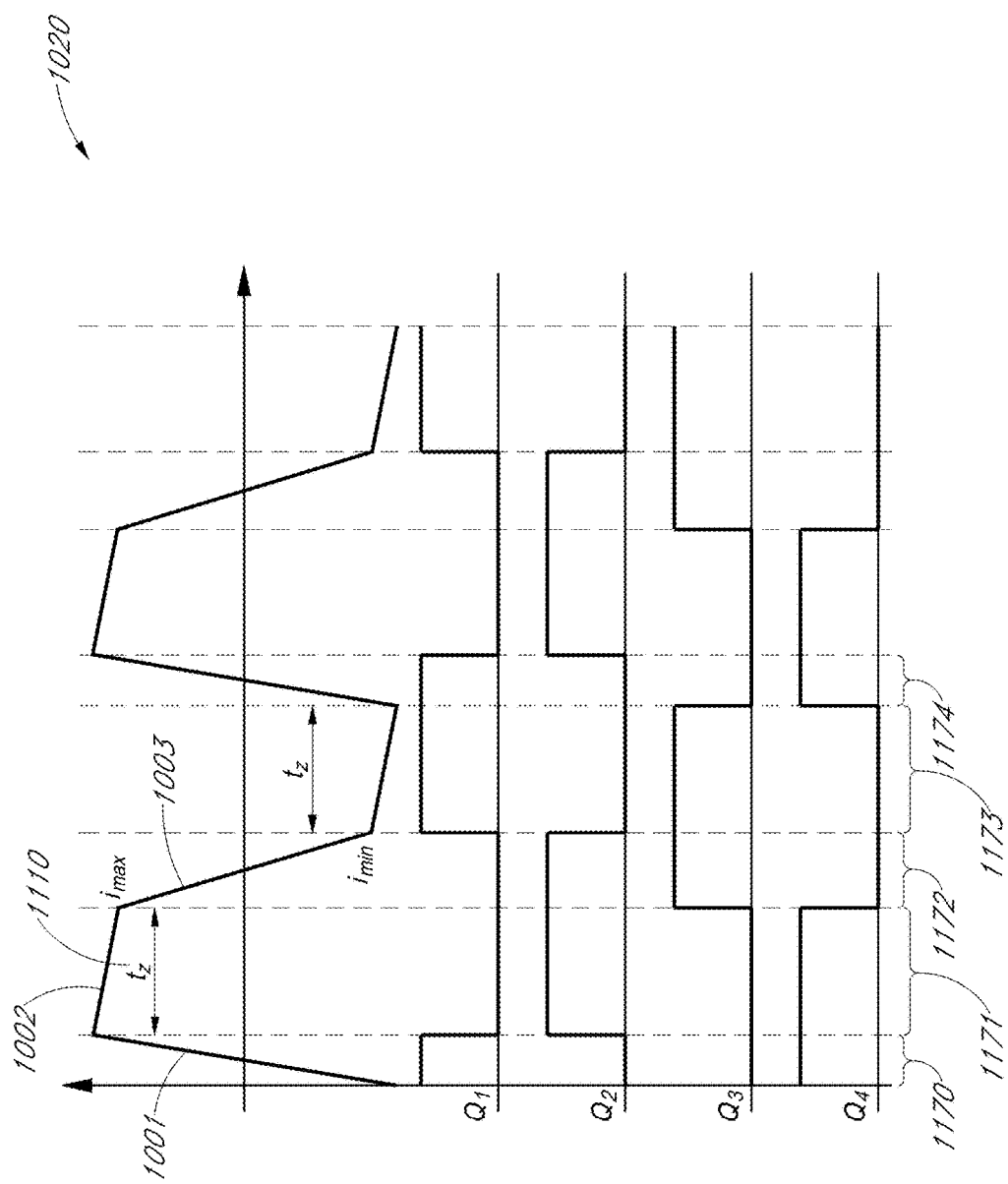

Other circuit topologies besides those in FIGS. 2 and 3 may also be employed in embodiments. These other topologies can include LC circuits in parallel with an AC load, where the time $T_z$ of a first rate of current decay as shown in FIGS. 11A-11C may be adjusted based on the value of the non-unity power factor. Thus, embodiments may include implementations with circuit topologies affected by non-unity power factor loses and the opportunity to improve efficiencies with selective shorting of an LC circuit in parallel with an AC load. And, as noted above, embodiments may also be employed where switch-state may be modified during zero-voltage crossing to maintain a minimum switching frequency.

Figure 4:
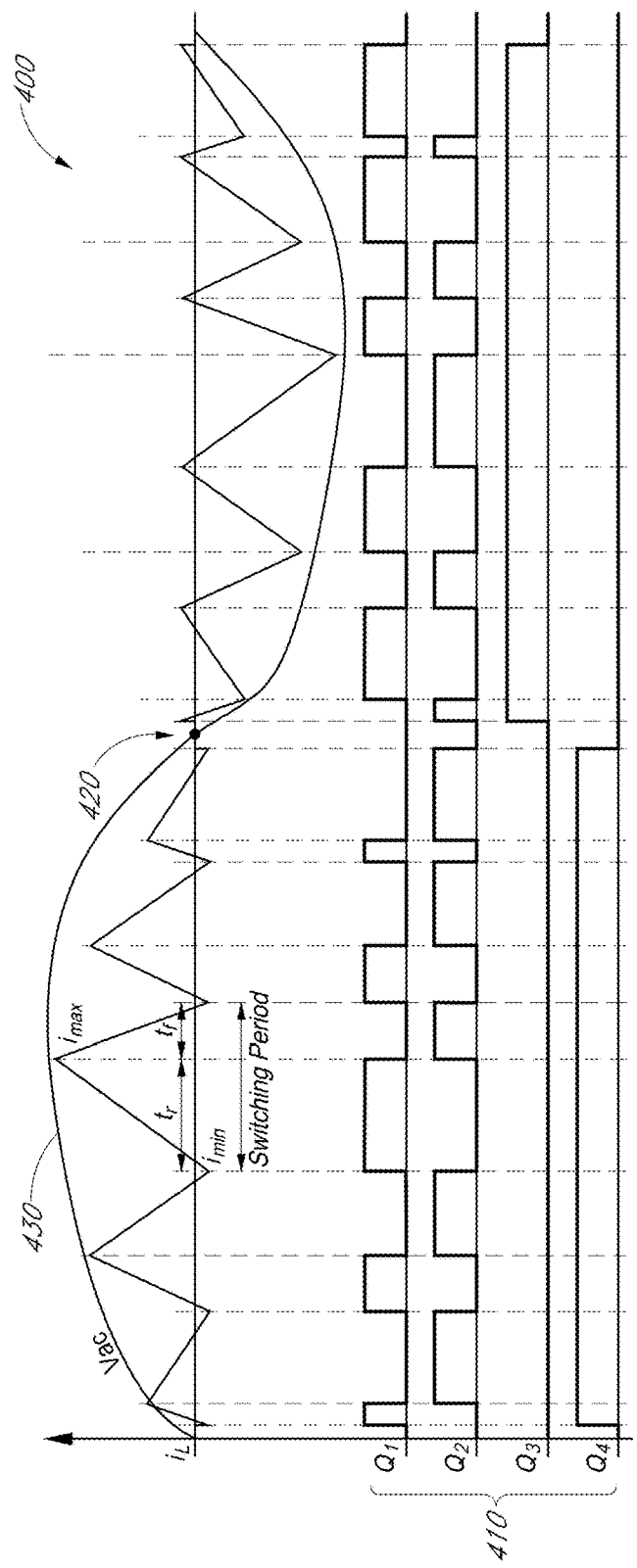
FIG. 4 illustrates a switch state table and associated voltage and current for a first switching mode, according to some embodiments.

FIG. 4 shows an exemplary inductor current waveform 400, voltage ac waveform 430, and associated switch-states 410 in a first mode of operation over one ac voltage cycle. As in embodiments, hysteresis current control may use pulse width modulation to regulate the average inductor current to its desired reference value by varying the current hysteresis bounds (i_max and i_min). The feedback for hysteresis and the associated control may be accomplished in various ways and through various techniques. As shown in FIG. 2, the output sensing 250 may send information to the controller 280 for evaluation and for sending updated instructions to the driver circuit for purposes of altering the gate signals of switches such as those in DC/AC inverter 230 and Q1-Q4 310-313 of FIG. 3.

In embodiments, the switches 310-313 may receive gate signals that serve to open and close them in different sequences during a cycle. At one portion of the cycle Q1 and Q2 may be opened and closed at synchronized opposite times and Q3 and Q4 may also be opened and closed at synchronized opposite times. When a zero-voltage crossing 420 is approached, all four switches may be closed as the voltage changes polarity. Once the polarity has changed, the previous Q1/Q2 and Q3/Q4 switching schedule may resume until the next polarity change. As can be seen in FIG. 4, which shows an all-closed at zero-voltage crossing switching protocol, the frequency of switching the Q1/Q2 pair may be higher than the switching frequency of switching the Q3/Q4 pair in switching protocols employed in embodiments. As can also be seen in FIG. 4, the current drops to zero when all four switches are open during a zero-voltage crossing, i.e. a change in polarity.

As can be seen in FIG. 4, embodiments may employ modes where Q3 and Q4 are switched at ac line frequency (60 Hz), while Q1 and Q2 are switched at high frequency (50 kHz to 150 kHz). When the ac voltage zero crossing 420 is approached from either direction, Q1 to Q4 may be all turned off for them to safely switch to the other voltage polarity. For each switching cycle in this mode, there are two voltage levels applied to L1: $v_b$-$v_{ac}$ and –$v_{ac}$ when $v_{ac}$>0, and –$v_b$-$v_{ac}$ and –$v_{ac}$ when $v_{ac}$<0.

In embodiments, hysteresis control may be employed using the measured voltages and inductor current to manage the gate signals of the four switches. Thus, the switching frequency may be adjusted based on instantaneous values of bus voltage, grid voltage, inductor inductance, and the commanded hysteresis bounds.

Figure 5:
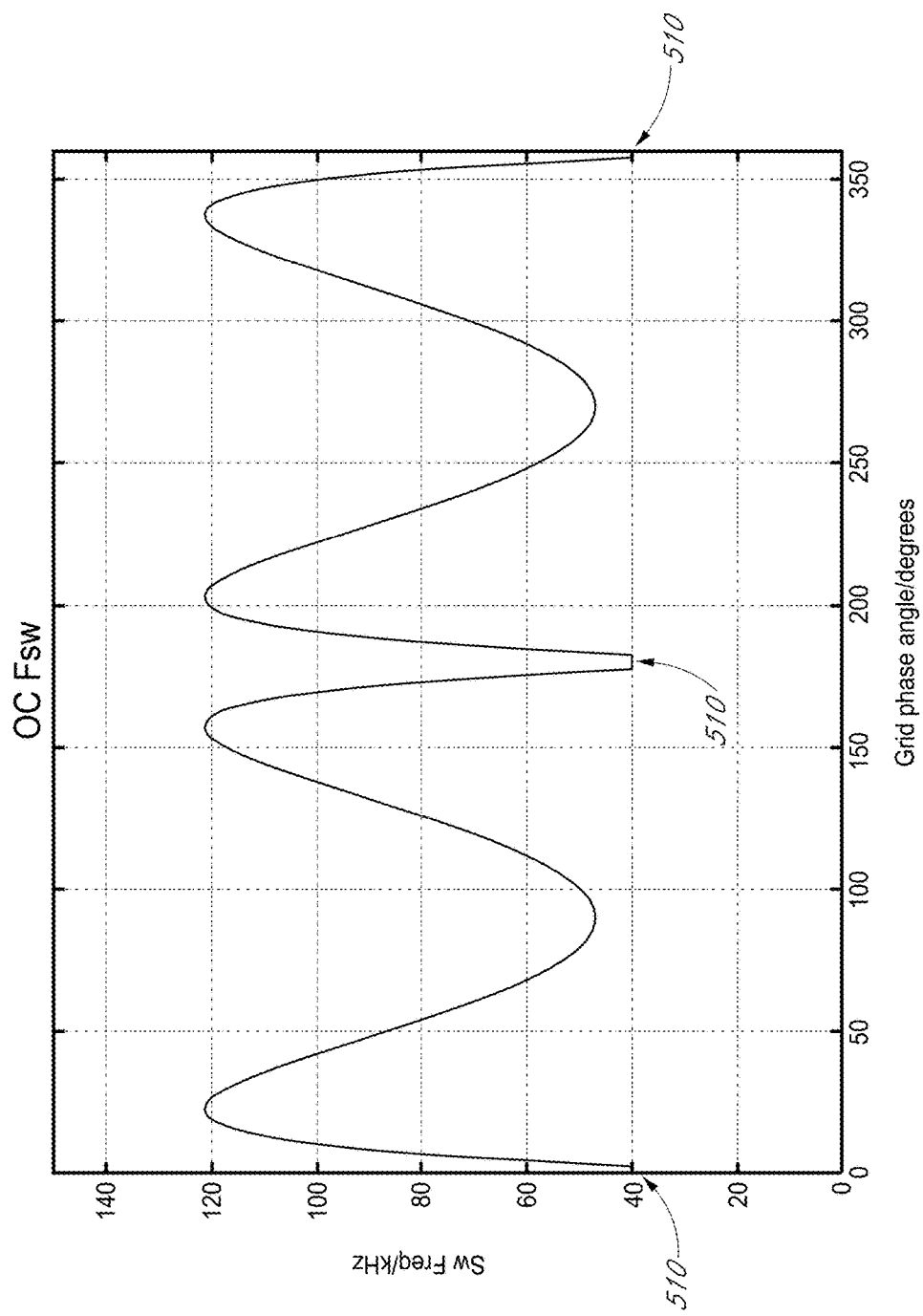
FIG. 5 illustrates a switching frequency versus grid voltage phase angle when the power factor is unity, according to some embodiments.

FIG. 5 shows the switching frequency on the left axis versus grid phase angle 500 of the lower axis when the power factor is one and the switching protocol of FIG. 4 is employed. The instantaneous switching frequencies for the various cycle times may be determined by considering current rise time during the charging phase and current fall time during the discharge phase. During the charging phase, the current rise time is $$t_r = L \frac{i_{max} - i_{min}}{v_b - v_{ac}}$$

and during the during the discharge phase the current fall time is $$t_f = L \frac{i_{min} - i_{max}}{-v_{ac}} = L \frac{i_{max} - i_{min}}{v_{ac}}$$

From these the instantaneous variable switching frequency of the output converter is $$f_{sw} = \frac{1}{t_r + t_f} = \frac{v_{ac}(v_b - v_{ac})}{L v_b (i_{max} - i_{min})}$$

FIG. 5 shows $f_{sw}$ when the power factor is one. As can be seen the switching frequency drops to its lowest point 510, 40 kHz, at each change in polarity. Using the above equations, the switching frequency over half an AC voltage cycle (the other half is the same because of the symmetry of sine wave) is shown in FIG. 5 for unity power factor (PF=1). It shows that the switching frequency is between 50 kHz and 200 kHz, which is a frequency range the output filter is designed for. However, such switching frequency range is not preferred when the power factor is not unity (either positive or negative). Other modes of operation may be employed and may be considered PFC modes when the power factor is not unity.

Figure 6:
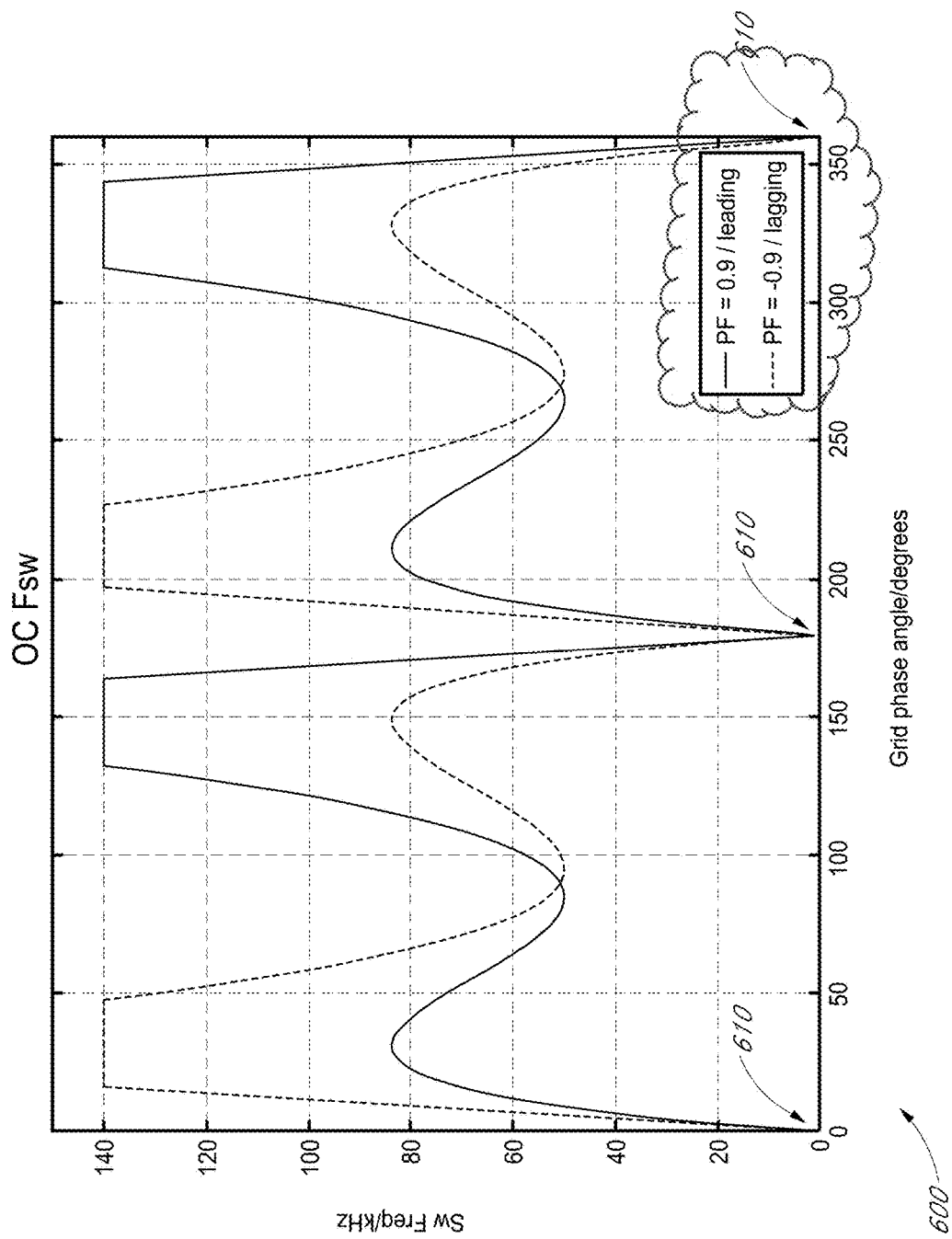
FIG. 6 illustrates a switching frequency versus grid voltage phase angle for a non-unity power factor, according to some embodiments.

FIG. 6 illustrates the switching frequency versus grid phase angle 600 when the power factor is non-unity, in this case 0.9 either leading or lagging, and the switching protocol of FIG. 4 is employed. As can be seen, the switching frequencies 610 near the polarity changes approach zero, which can lead to unsuitable output current distortion and likewise failed harmonic testing. Thus, embodiments may employ the switching protocol of FIG. 4 when the power factor is unity but may employ other switching protocols when the power factor is non-unity.

Figure 7:
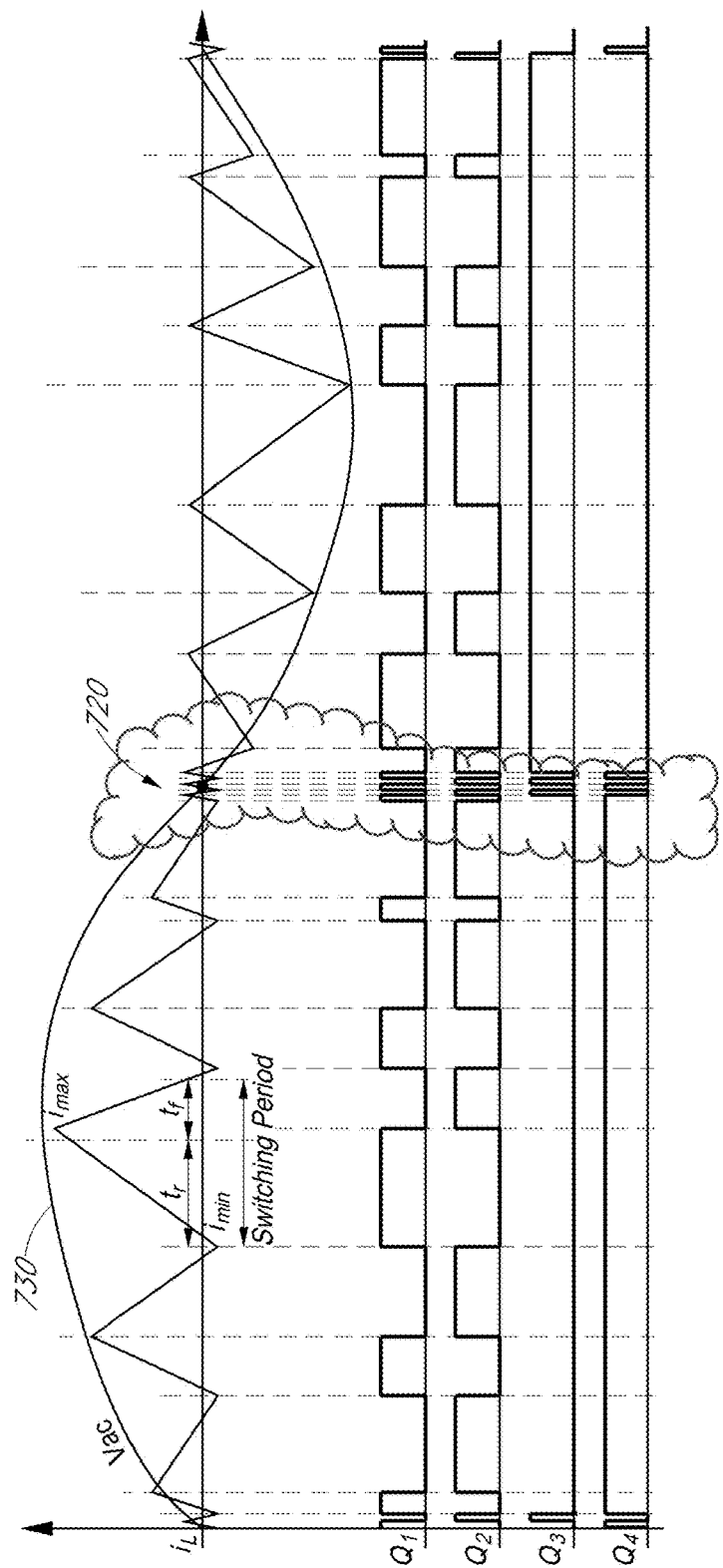
FIG. 7 illustrates a switch state table and associated voltage and current for a second switching mode, according to some embodiments.
Figure 8:
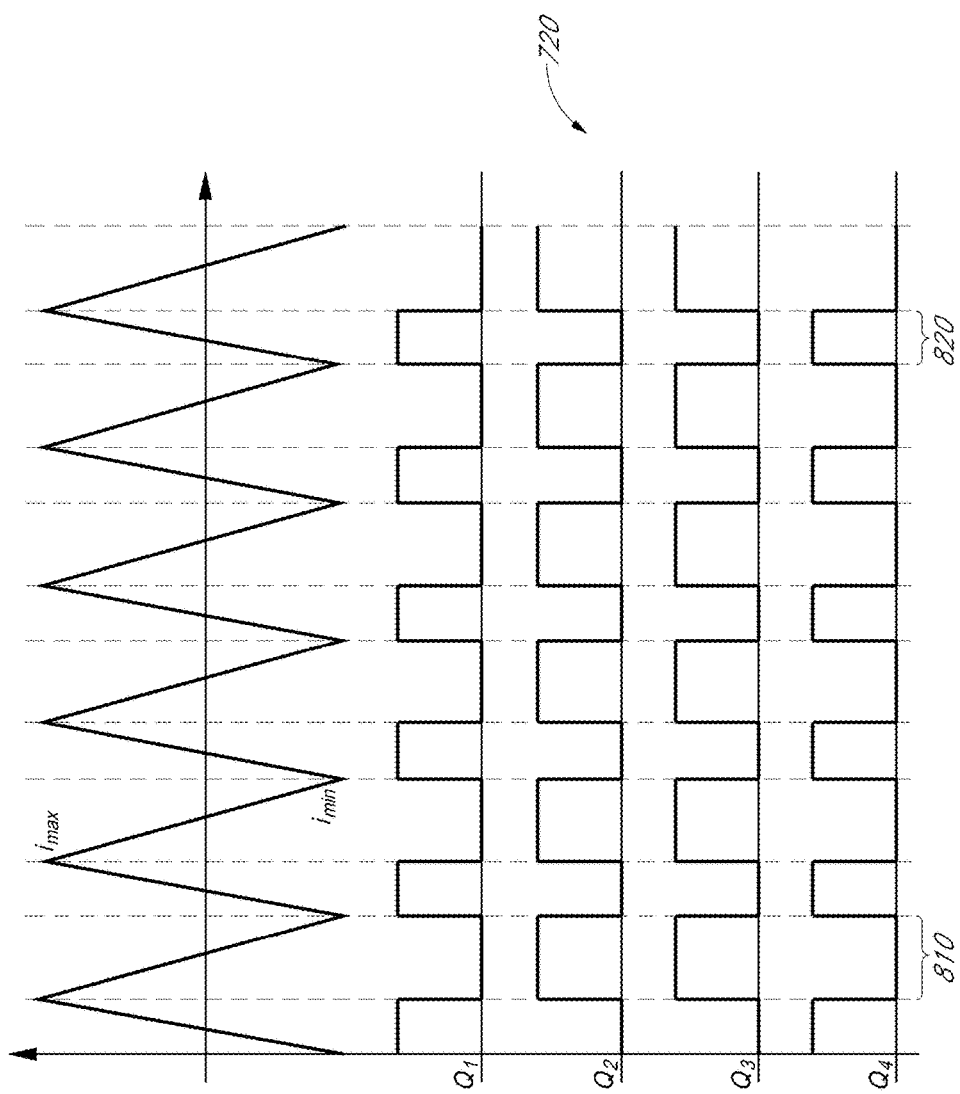
FIG. 8 illustrates an enlarged portion of the switch state table of FIG. 7 with switch state and associated current during a zero-voltage crossing, according to some embodiments.

FIG. 7 shows a second mode of operation or switching protocol as may be employed in embodiments. As the change in polarity approaches, the switch timing may be changed. This change in switch timing is shown in FIG. 7 at 720 and the enlarged detail of this timing change is shown in FIG. 8. As can be seen in FIG. 7, during this timing change the measured current $i_L$, stays within a close range and has similar periods of increase and decrease and rate of change, i.e. slope. The voltage $V_{ac}$ is shown by 730.

As shown in FIG. 8, which shows an enlarged portion of FIG. 7, near 720, rather than having Q3 and Q4 firing at a much slower frequency than Q1 and Q2, during this second mode, near zero-crossing, Q1 and Q2 and Q3 and Q4 are firing within a frequency range much closer to each other and the duration of Q1 and Q4 820 is shared. Likewise, the duration 810 of Q2 and Q3 is also shared. This shared duration of switching times may be accomplished by having switches share the same gate signal. Thus, for periods of time near zero-crossing, switches Q1 and Q4 may share the same gate signal and, likewise, switches Q2 and Q3 may also share the same gate signal.

Figure 9:
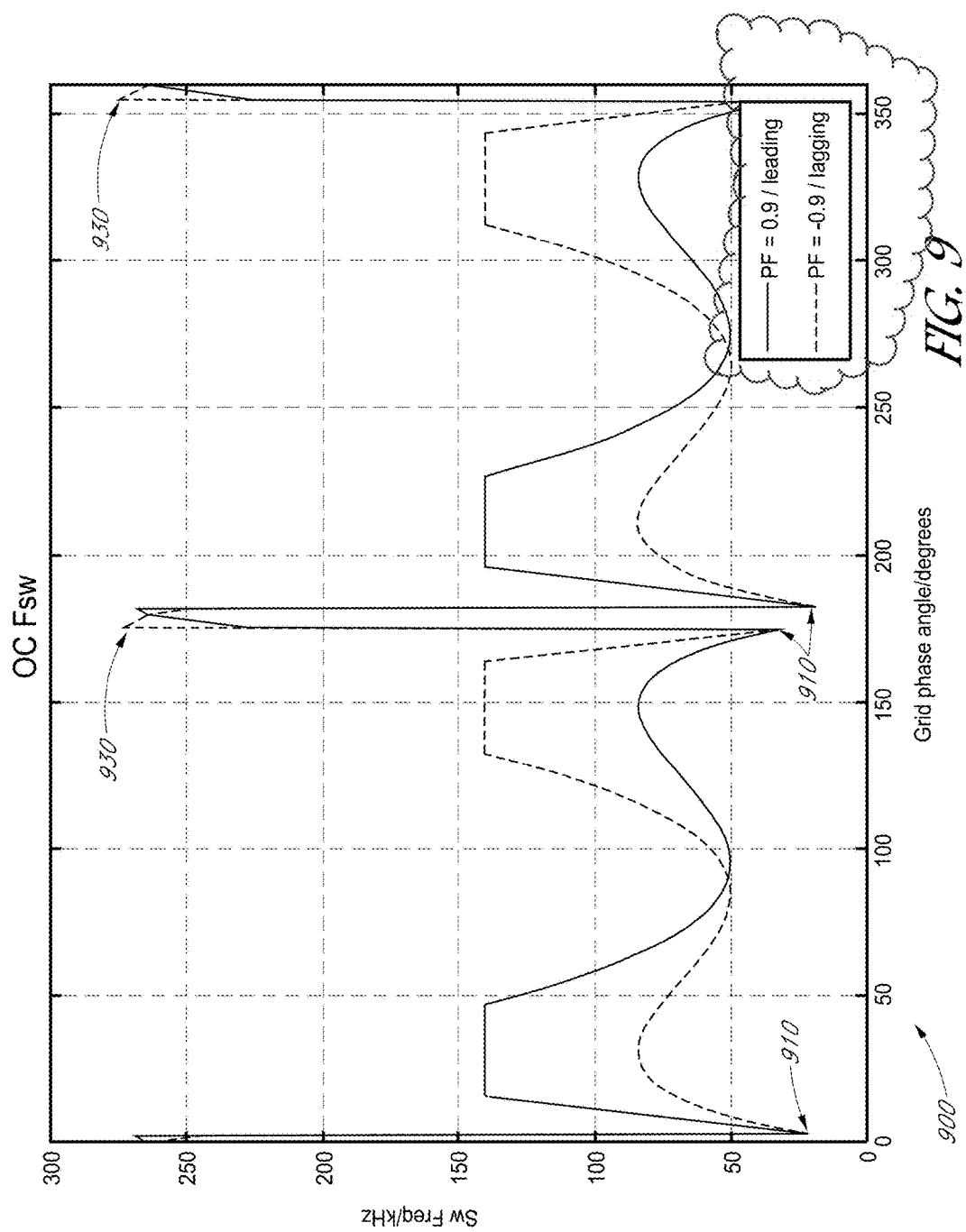
FIG. 9 illustrates a switching frequency versus grid phase angle for a non-unity power factor and a second switching mode, according to some embodiments.

FIG. 9 illustrates the switching frequency versus grid phase angle 900 when the power factor is not unity, either leading or lagging, and the switching protocol of FIGS. 7 and 8 is employed. As can be seen, minimum switching frequencies 910 do not approach 0, but, rather stay above the 10-15 kHz range when zero-crossings approach. Thus, in embodiments, a mode may provide for switching all four switches, e.g., MOSFETs, at high frequency (vs only two in the normal mode) at around ac voltage zero crossing when operating in the non-unity power factor mode. By using this technique, Q1 and Q4 share the same PWM signal (as do Q2 and Q3, see the zoom-in portion 720 of FIG. 8. In so doing, the voltage applied to L1 is either +$v_b$-$v_{ac}$ or -$v_b$-$v_{ac}$ The switching frequency is very high in this mode, see FIG. 9 at 930, by calculating the switching frequency using the formulas and techniques described above. Such high switching frequency (up to 250 kHz) may not be preferred as they can lead to higher loss, as well as pose a challenge to the EMI filter design. Thus, while this mode may be implemented using shared gate signals, the resulting frequencies may be too low in the normal switching mode (too much current distortion and harmonics, as in 610 of FIG. 6) and the switching frequency may be too high in the two-level PFC mode (high switching loss and EMI difficulty, as in 930 of FIG. 9). Therefore, a third mode, with further switching implementations may also be employed in non-unity power factor operation scenarios. This third mode may also be employed for use for voltage zero crosses during non-unity power factor modes. This mode may serve to introduce an additional switching level when all four switches, e.g., MOSFETs, or other switches are fast switching around a voltage zero cross when the power factor is not one. In addition to the switching levels (+$v_b$-$v_{ac}$ and -$v_b$-$v_{ac}$), the zero level (-$v_{ac}$), in which both Q2 and Q4 (or Q1 and Q3) are closed, may also be applied to L1 in the hysteresis current control for this third mode. As a result, switching frequency may be tuned further to a switching frequency in a desirable range above zero, preferably 50-150 kHz.

Figure 10:
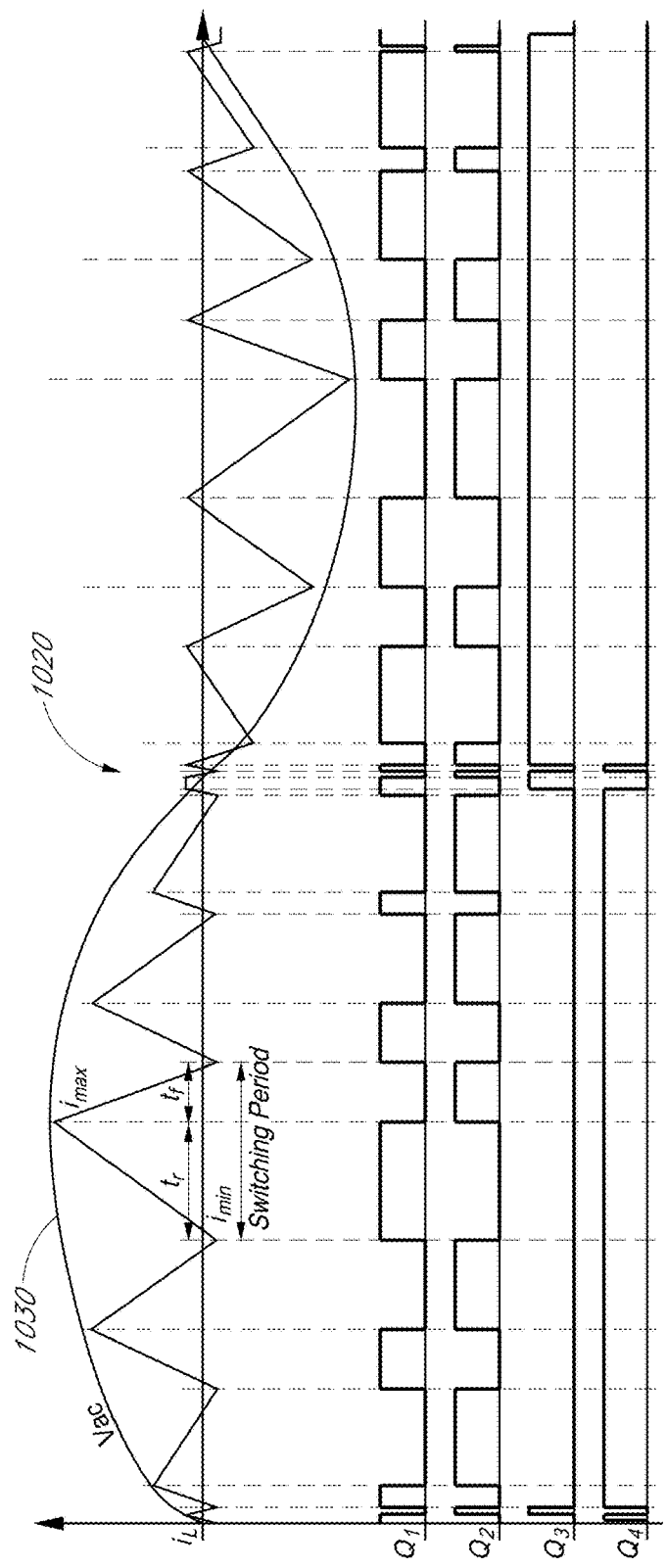
FIG. 10 illustrates a switch state table and associated voltage and current for a third switching mode, according to some embodiments.

This third mode may present three voltage levels to the switches during one switching cycle. FIG. 10 shows where the third mode may have this three-voltage switching near zero-crossing 1020. Thus, before and after this zero-crossing 1020, the switch timing may be changed such that inductor current rises 1001 rises at a first rate, peaks, then falls at a second rate 1002, before falling further as a third rate 1003. Voltage $V_{ac}$ for the switching-state is shown by 1030.

FIG. 11A also shows the correlation between the gate signal timing and the change in inductor current as may be experienced during this third switching mode. As can be seen in FIG. 11A, the waveform looks trapezoidal instead of triangular as in FIG. 8, after introducing the zero-voltage level through the timing of switches Q1-Q4. The duration of the zero-voltage level state, marked $t_z$ in FIG. 11A, may be either programmable or fixed, depending on how this third mode is implemented.

FIGS. 11B and 11C show other switching states that may be employed in embodiments. The switch timing 1150-1155 and 1170-1174, indicate when each of the four switches may be triggered on and off during these switching states.

Figure 12:
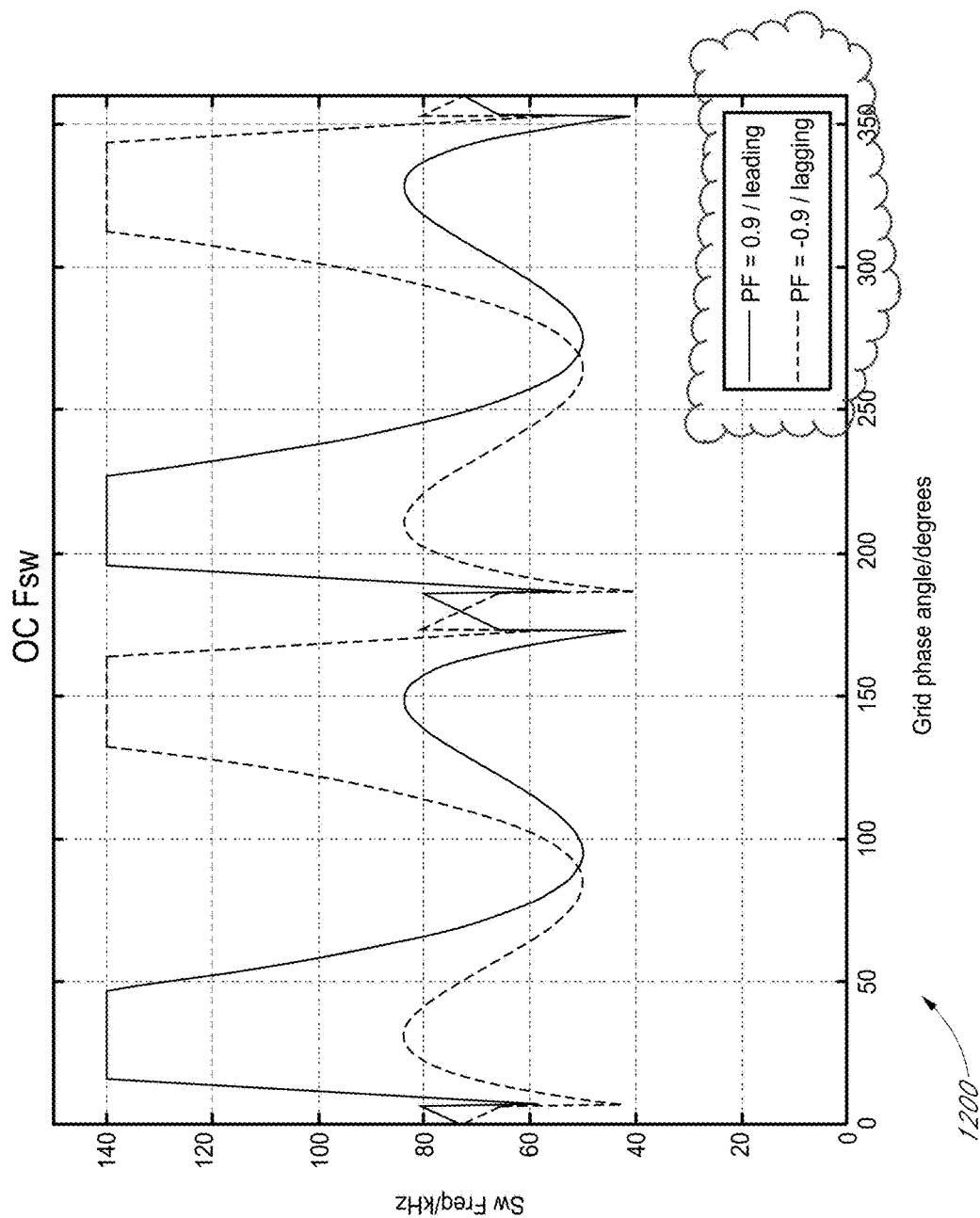
FIG. 12 illustrates a switching frequency versus grid phase angle for a non-unity power factor and a third switching mode, according to some embodiments.

FIG. 12 illustrates the switching frequency versus grid phase angle 1200 when the power factor is not unity, either leading or lagging, and the switching protocols of FIGS. 10 and 11 are employed. As can be seen, in embodiments, the instantaneous AC voltage may be low at zero-crossing and the inductor current di/dt may be relatively small in the zero-voltage level state as well. The reduced change of current versus time, i.e., di/dt, serves to increase the switching period, thus reducing the switching frequency. The switching frequency can be tuned to the expected range if picking a proper $t_z$ in the circuit design process. FIG. 12 shows the switching frequency analysis of embodiments of the third mode switching scheme, i.e., the three-level switching scheme. As can be seen, the switching frequency is within a suitable range (between 50 kHz and 150 kHz), one that serves to minimize losses and reduce EMI filter complexities.

In embodiments, the three-level switching techniques described herein may be applied to an entire ac voltage cycle as well and not just near a zero-crossing. However, such techniques may not be necessary or preferred as the technique may provide benefits solely during zero-crossing and may add switching losses from what can amount to superfluous switching. Thus, algorithms, such as those addressed above for FIG. 1, may be employed to regulate operation between two or more operational modes.

String inverters, central inverters, standalone inverters, grid-tied inverters and motor drives may also employ configurations and methods described herein along with other designs and modifications to them and the other embodiments described herein. For example, an averaging filter may employ a lower cut-off frequency to compensate for the current distortion if the output converter doesn't switch through the zero cross. Also, in two-level switching mode, the EMI filter may employ higher attenuation to meet the conducted EMI requirement when the output converter switches through the zero cross. Still further, a hard-switch through the zero cross may also be employed without significantly increasing the size the filters and hard-switching may be employed while promoting higher efficiencies if alternative material semiconductor devices like GaN or SiC are employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An electrical conversion process comprising:
   operating a first electrical circuit, the first circuit configured to receive dc voltage and convert the received dc voltage into cyclically alternating voltage and cyclically alternating current, the first electrical circuit having a group of switches;
   cyclically outputting the alternating voltage and the alternating current to a first node and a second node;
   determining whether a unity power factor or a non-unity power factor exists for the alternating output voltage and the alternating output current within the first electrical circuit; and
   when a non-unity power factor exists for the alternating output voltage and the alternating output current, shorting the first node to the second node for a time $T_S$ when the alternating output voltage phase angle is within ±22.5° of a zero-voltage crossing,
      wherein the time $T_S$ is set in relation to a switching frequency of switches, from the group of switches, creating the cyclical output of alternating voltage at the first node or the second node.

2. The process of claim 1 wherein shorting the first node to the second node for a time $T_S$ occurs when the alternating output voltage phase angle is within 20 degrees of a zero-voltage crossing.

3. The process of claim 1 wherein the group of switches comprises four switches in an H-Bridge topology and these four switches are switching in pairs with a first pair switching at a power line frequency and a second pair switching at a frequency at least one hundred times the power line frequency and wherein during zero-voltage crossing the first pair switching frequency increases to a frequency greater than power line frequency.

4. The process of claim 1 wherein the duration of the time $T_S$ is set as a percentage of a switching period corresponding to the switching frequency.

5. The process of claim 1 wherein the time $T_S$ exceeds half of a period of time to fully cycle a switch of the group of switches from an open position, to a closed position, and back to the open position.

6. The process of claim 1 further comprising:
   using a sensing circuit to determine $T_S$, the sensing circuit analyzing alternating waveforms output by the first electrical circuit; and
   maintaining the determined $T_S$ for two or more output voltage cycles.

7. The process of claim 1 wherein the group of switches comprises four switches in an H-Bridge topology and wherein gate signals sent to the switches during periods of zero-voltage crossings consist of durations of $T_S$, $T_2$, and $T_3$ for a single full cycle and wherein $T_S$ is greater than or equal to $T_2$ plus $T_3$.

8. The process of claim 1 wherein the duration for shorting the first node to the second node for a time $T_S$ depends upon the magnitude of the power factor.

9. A system comprising:
an inverter circuit with two or more switches, the inverter circuit configured to receive a dc input voltage and output an alternating output voltage; and
a gate controller configured to send gate command signals to one or more of the switches in the inverter circuit for purposes of converting the dc input voltage to the alternating output voltage,
wherein the gate controller is also configured to
determine whether a unity power factor or a non-unity power factor exists for the alternating output voltage and the alternating output current within the first electrical circuit, and
send gate command signals when the non-unity power factor exists for the system, the gate command signals serving to create a single current cycle having changing output current with three different rates of current change during the single current cycle, the three different rates of current change having durations of $T_1$, $T_2$, and $T_3$, and
wherein the sum of $T_1$ plus $T_2$ is equal to or less than the duration of $T_3$.

10. The system of claim 9 wherein the time $T_1$ represents a duration of a short circuit across the switches.

11. The system of claim 9 wherein the gate controller is further configured to send gate command signals creating durations $T_1$ and $T_2$ to a switch of the inverter circuit only when the alternating voltage generated by the inverter circuit is within ten degrees of a zero-voltage crossing and moving towards the zero-voltage crossing.

12. The system of claim 9 wherein the inverter circuit comprises a four switch H-bridge and wherein the gate controller is configured to switch two of the switches in the H-Bridge at line frequency and two the switches in the H-Bridge at least one-hundred times line frequency.

13. The system of claim 9 wherein the inverter circuit comprises a four switch H-bridge and wherein switching frequency of switches in the H-bridge changes during the zero-voltage crossing.

14. The system of claim 9 wherein a peak waveform of the alternating current has different slopes during durations $T_1$, $T_2$, and $T_3$.

15. The system of claim 9 wherein the duration of time of $T_1$ depends upon the magnitude of the non-unity power factor for the system.

16. An inverter circuit comprising:
a plurality of switches in a power train configured to convert a received dc voltage into a cyclically alternating output voltage; and
a controller configured to control a switching state of each of the switches in the plurality of switches, the switching state including switching a pair of the switches consistent with a power line frequency and a pair of the switches at a high frequency, which is ten times or more, faster than the power line frequency,
wherein the controller is further configured to operate the switches in multiple switching modes where a first switching mode is maintained during a zero-voltage crossing when a power factor being monitored is in unity, and where a second mode is used when a power factor being monitored is not in unity,
wherein the second mode includes a switching state change through a zero-voltage crossing, the switching state change including introducing a short circuit into the switching scheme of the plurality of switches, the short circuit having a duration of $T_S$, the duration of $T_S$ being set using a measured switching frequency of one or more switches in the plurality.

17. The inverter circuit of claim 16 wherein the controller enters the second mode when a voltage phase angle for a power grid receiving power from the plurality of switches is at or within 20 degrees of a zero-voltage crossing.

18. The inverter circuit of claim 16 wherein the controller enters the second mode when the switching frequency of a pair of switches in the plurality is less than a predetermined minimum switching frequency.

19. The inverter circuit of claim 18 wherein the predetermined minimum switching frequency is at or greater than 15 kHz.

20. The inverter circuit of claim 16 wherein a full cycle of a switching state in the second mode consists of three different switching state durations, $T_S$, $T_2$, and $T_3$, where $T_2$ and $T_3$ are not equal in duration and where $T_S$ is used twice.

* * * * *